(12) United States Patent
Easton et al.

(10) Patent No.: US 6,935,434 B1
(45) Date of Patent: Aug. 30, 2005

(54) HITCH CONTROL SYSTEM WITH SPRING CENTERED CONTROL LEVER

(75) Inventors: David Joseph Easton, Cedar Falls, IA (US); Bruce Craig Newendorp, Cedar Falls, IA (US); Mark Allen Bergene, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 21 days.

(21) Appl. No.: 10/799,107

(22) Filed: Mar. 12, 2004

(51) Int. Cl.$^7$ ............................................. A01B 63/112
(52) U.S. Cl. .............................. 172/7; 172/439; 701/50
(58) Field of Search .................. 172/2, 7–12, 439–451, 172/677–680; 701/50

(56) References Cited

U.S. PATENT DOCUMENTS

| | | | |
|---|---|---|---|
| 4,023,622 A | * 5/1977 | Gregerson | 172/9 |
| 4,508,176 A | 4/1985 | Wiegardt et al. | 172/7 |
| 4,518,044 A | 5/1985 | Wiegardt et al. | 172/7 |
| 4,969,527 A | * 11/1990 | Boe et al. | 172/7 |
| 4,979,092 A | 12/1990 | Bergene et al. | 364/148 |
| 5,343,775 A | 9/1994 | Easton et al. | 74/532 |
| 5,764,219 A | * 6/1998 | Rutledge et al. | 345/159 |
| 5,957,218 A | 9/1999 | Noonan et al. | 172/239 |
| 6,041,867 A | 3/2000 | Orbach et al. | 172/2 |
| 6,065,365 A | * 5/2000 | Ostler et al. | 74/528 |
| 6,216,072 B1 | 4/2001 | Boe et al. | 701/50 |
| 6,425,450 B1 | * 7/2002 | Lansberry | 180/9.36 |

OTHER PUBLICATIONS

Deere & Company, "Accudepth 2200 Field Cultivator 2400 Chisel Plow Operator's Manual", 1997, 6 pages.
Deere & Company, 7600, 7700, and 7800 Tractors Operator's Manual, 1992, pp. 1 & 50-1 to 50-7.
CIH, "5220-5230-5240-5250 Operator's Manual", Jul. 1992, pp. 94-109.

* cited by examiner

*Primary Examiner*—Christopher J. Novosad

(57) ABSTRACT

A hitch control system controls a vehicle hitch to which implements can be attached. The hitch control system includes a spring-centered primary command lever which is manually moveable from a centered position to deflected positions, and which automatically returns to the centered position when released from a deflected position. A control unit generates a hitch command signal in part as a function of the lever position. The control unit has a closed-loop control mode wherein the valve command signal is generated in response to parameter, such as position and draft force, and the hitch command signal. The control unit moves the hitch in a step-wise manner by a predetermined amount in response to momentary deflection of the command lever to one of the deflected positions, and the amount of hitch movement is independent of an amount and duration of deflection of the command lever if the duration is not more than a predetermined duration.

11 Claims, 2 Drawing Sheets

HITCH CONTROL SYSTEM WITH SPRING CENTERED CONTROL LEVER

BACKGROUND

The present invention relates to a control system for controlling a vehicle mounted hitch to which an implement can integrally attached.

Conventional hydro-mechanical hitch control systems typically include a large non-spring centered hitch command lever with a long operation range capable of moving stiff hydro-mechanical mechanisms. The operator could manipulate such a lever and set a depth and/or draft force operating point wherein the position of the lever would represent the set point. In a pure depth control mode, the lever position may represent the actual position of the hitch. In a draft force or a mixed draft force/depth control mode, the lever position will not normally represent the actual position of the hitch. In such a system there is no clear indication of whether or not the lever position is or is not indicative of the hitch position. This ambiguity often leads to operator confusion.

With the advent of electro-hydraulic hitch control systems, the need to move such stiff mechanisms has diminished, but electronic hitch control systems have continued to use such conventional hitch command levers. Examples of such hitch control systems are described in U.S. Pat. Nos. 6,216,072, 4,979,092, 4,518,044 and 4,508,176, all assigned to the assignee of the present application. Hitch systems with such command levers have been available on production tractors, including, for example, John Deere Model 8000 tractors.

In an electro-hydraulic hitch control system with such a conventional primary command lever, the operator may have incomplete command of the hitch, and incomplete feedback on how the control system is functioning. For instance, an operator may use one of the operator controls to command the hitch to move to a lower position. The hitch, however, may not lower for any number of reasons, with no indication of why it did not. The manipulated control may be, for the given conditions, an inappropriate choice. There may be mechanical reasons why the hitch did not lower, such as gauge wheels on an implement or very cold oil in the system. There may be operational reasons, such as other controls or inputs to the system, which prevent the hitch from responding as the operator intended.

In such a conventional hitch control system, the hitch control unit generates a setpoint parameter as a function of draft force or position, or a mixture of draft force and position, and controls the hitch in a closed-loop manner in response to the setpoint. In some circumstances, in a hitch control system with such a primary control lever, the lever must be temporarily disregarded (locked out) by the hitch control software until another event causes the lever to again become relevant. For example, if the hitch is moved due to actuation of another control (such as a raise-lower switch), then the control lever position no longer corresponds to the setpoint, and the control system must ignore the position of the control lever until the lever is moved to a position which again correlates to the setpoint.

Such a hitch control system may not produce predictable, repeatable results in response to small adjustments in hitch command during tractor operation. Such a hitch control system can cause operator frustration and can make proper setup and use of the hitch a difficult task.

One known commercially available hitch control system included a non-spring centered primary command or setting lever which was used to adjust the hitch operating setpoint, together with a separate spring-centered hitch switch or lever which could be used to raise or lower the hitch in an open-loop mode and which would override the command position set by the setting lever. Thus, it is believed that the primary hitch command lever was subject to the aforementioned problems.

An active depth control system has been available for towed implements such as field cultivator or chisel plow, wherein a hydraulic cylinder on the towed implement is controlled by a manually operated spring-centered control lever in the tractor cab. This known depth control system includes a "flick mode" wherein the towed implement is raised or lowered by a pre-set amount (such as a tenth of an inch) when the control lever is moved forward or back slightly and released. But, such a control mode has not been possible with the conventional control systems for integral type hitches.

It would be desirable to have a control system for an integral type hitch with a primary control lever which is never is locked out, so that the operator can always use that primary control lever for command of hitch movement.

SUMMARY

Accordingly, an object of this invention is to provide a hitch control system which has a primary control or command lever which is never is locked out.

A further object of the invention is to provide such a hitch control system wherein the primary control lever can always be used for command of hitch movement.

A further object of the invention is to provide such a hitch control system with improved functionality.

A further object of the invention is to provide such a hitch control system wherein the primary command lever is a spring-centered lever.

A further object of the invention is to provide such a hitch control system wherein a hitch command signal is incremented in a step-wise manner in response to brief momentary motions of the spring centered command lever away from its centered position.

These and other objects are achieved by the present invention, wherein a hitch control system includes a spring-centered primary hitch command lever, operator input setting devices, position and draft force parameter sensors, and a hitch control unit. The control unit generates hitch raise and lower valve command signals in response to operation of the command lever, the setting devices and the sensors. When released, centering springs will return the hitch command lever to its centered position except when it is moved to a fully forward detent position. In response to deflection of the lever from the center position in one direction, the control unit will generate valve command signals which cause the hitch to move upward, and in response to deflection of the lever from the center position in the other direction, the control unit will generate valve command signals which cause the hitch to move downward. In response to brief motions of the lever away from its centered position the hitch control unit moves the hitch in uniform steps, independent of the amount of lever movement or exact duration of lever movement.

When the command lever is in the fully forward detent position, the hitch control unit implements a "float" condition wherein the lower valve is opened, allowing the hitch to go to its lowest mechanically allowed position, without altering any setpoints.

DETAILED DESCRIPTION

Figure 1:
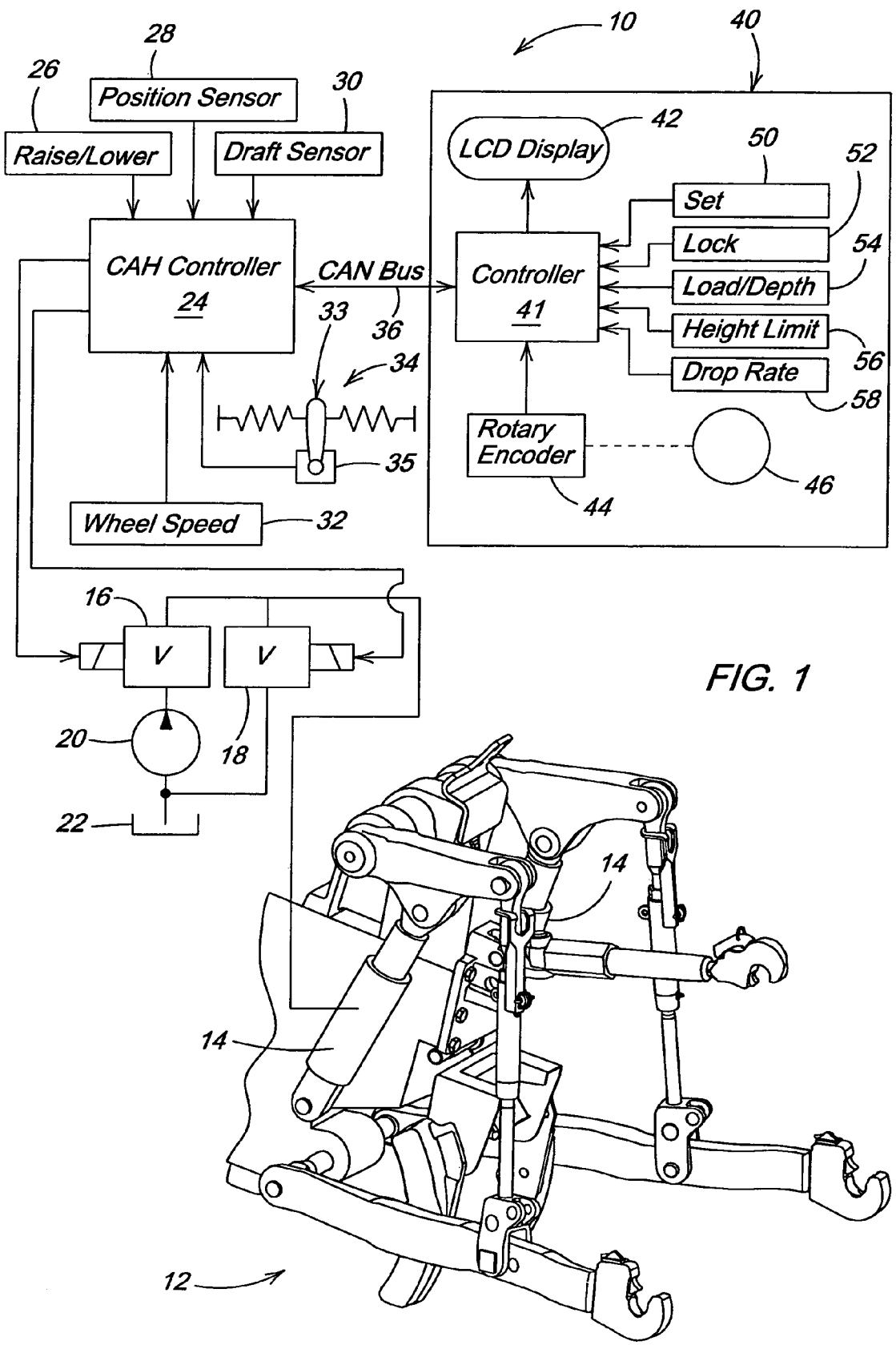
FIG. 1 is a schematic diagram of a hitch control system with a spring-centered hitch command lever.
Figure 2:
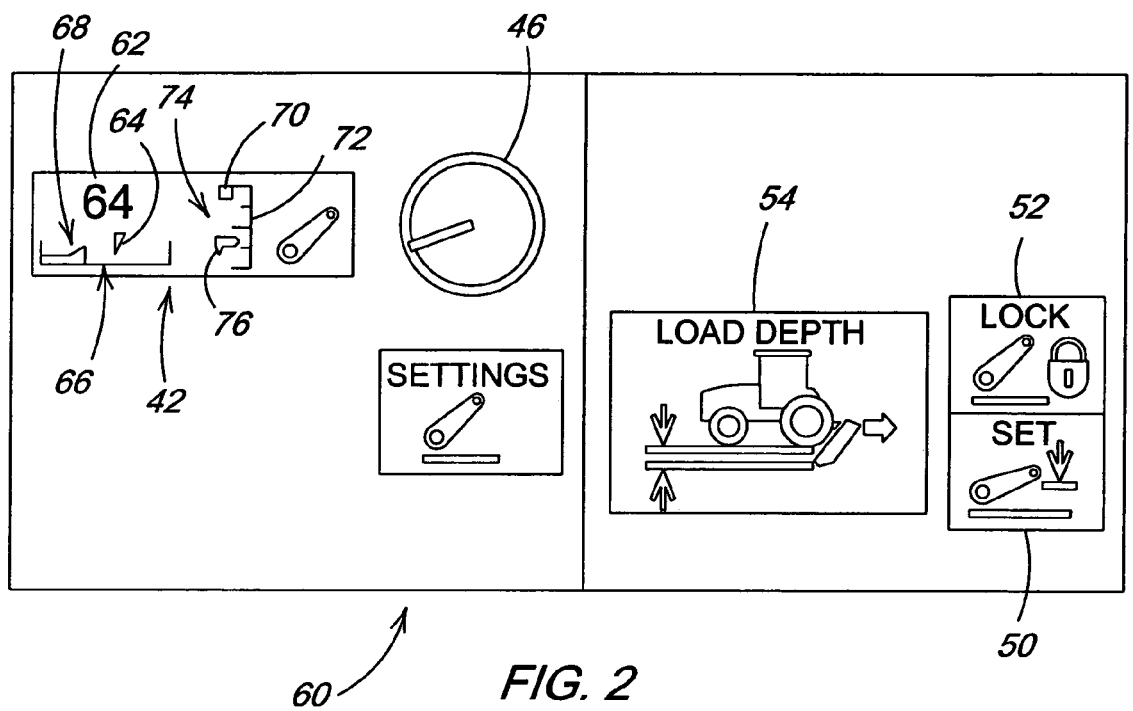
FIG. 2 is front view of a display/control panel for use in the present invention.

Referring to FIG. 1, a hitch system 10 includes a hitch 12, such as a conventional 3-point hitch, to which tools and implements (not shown) can be integrally attached, as distinguished from towed implements which are coupled to a tractor drawbar (not shown). The hitch 12 is raised and lowered by conventional hitch cylinders 14. Conventional electro-hydraulic raise and lower valves 16, 18 control communication between pump 20, reservoir 22 and cylinder 14. Valves 16 and 18 are controlled by valve command signals generated by a microprocessor-based electronic control unit 24 which includes conventional valve drivers (not shown). Control unit 24 receives signals from a conventional external raise/lower switch 26, and parameter signals including a hitch position signal from a conventional hitch position sensor 28, a draft force signal from a conventional draft force sensor 30, a vehicle or wheel speed signal from a conventional vehicle or wheel speed sensor 32, and a hitch command signal from a hitch command lever 33.

A conventional CAN bus 36 communicates the control unit 24 with a display/control unit 40. Display/control unit 40 includes a controller 41, display 42, and a rotary encoder 44 which is controlled by a rotary control knob 46. Control unit 40 also includes a set switch 50, a lock switch 52, a load/depth switch 54, a height or raise limit switch 56 and a drop rate switch device 58. Control unit 24 transmits signals from sensors and control devices 26–34 to control unit 40 via CAN bus 36. Display/control unit 40 receives signals from encoder 44 and switches 50–58 and transmits the signals to display 42 and control unit 24.

The switches 50–58 are preferably implemented as touch switches on the display/control panel 40 utilizing known touch switch technology. Such a touch switch control/display panel is known and has been commercially available on production equipment, such as John Deere Model 7020 tractors. As in this known control panel, the control knob 46 is preferably also mounted on the control panel 40.

A load/depth mix signal associated with load/depth mix select switch 54 can be set by actuating switch 54 and adjusting the associated value with the rotary control knob 46. The height limit signal associated with height limit select switch 56 can be set by actuating switch 56 and adjusting the associated value with the rotary control knob 46. A drop rate signal associated with drop rate select switch 58 can be set by actuating switch 58 and adjusting the associated value with the rotary control knob 46. Alternatively, load/depth, height limit and drop rate values could be set or adjusted using for each value a separate conventional rotary transducer coupled to control knob, such as used on production John Deere 7000 tractors.

Figure 4A:
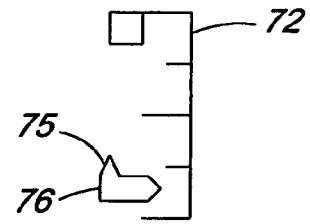
FIGS. 4A and 4B show alternate conditions of a portion of the display of FIG. 2.
Figure 4B:
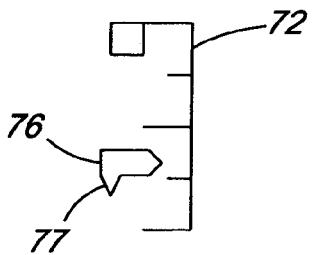

The display 42 preferably includes a 2-digit numeric display 62 which represents a hitch command signal generated by the controller 24. The display 62 helps an operator achieve repeatability, so that after adjustments or other hitch use, a particular hitch command may be repeated. Hitch command is also preferably graphically represented by the position of a marker 64 relative to a bracketed line 66. The position of a depth stop is represented graphically by symbol 68. An upper height limit is represented by the position of the lower end of a graphic symbol 70 relative to a vertical line 72 with hashmarks 74. An arrow-like symbol 76 represents the actual position of the hitch 12. As best seen in FIGS. 4A and 4B, a small upward pointing arrow 75 can be displayed when the hitch raise valve 16 is open, and a small downward pointing arrow 77 can be displayed when the hitch lower valve 18 is open.

Thus, display/control panel 40 displays various operating parameters, such as hitch command, draft mix, and raise limit, together with indication of hitch valve operation. The display allows the operator to observe the result of the various system inputs, whether the hitch is being commanded to go up, down, or not. Such a system makes it easy for the operator to understand hitch operation and diagnose problems related to use of the hitch.

A hitch command lever unit 34 includes a spring-centered lever 33 and a lever position sensor or transducer 35. The control unit 24 also receives the lever position signal from sensor 35. Lever unit 34 is preferably similar to the lever unit described in U.S. Pat. No. 5,343,775, issued 6 Sep. 1994 to Easton et al., but with a lever shaped so that it can easily be distinguished from conventional selective control valve control levers (not shown) which may be positioned nearby.

The control unit 24, in response to the various inputs to it, generates the valve command signals according to an algorithm which is basically similar to the algorithm described in U.S. Pat. No. 4,979,092, which is incorporated by reference herein. For example, the control unit 24 generates, through a closed control loop, the valve command or hitch control signals as a function of signals representing the lever position, hitch position, draft force, wheel speed, load/depth mix, height limit and drop rate signals and as a function of various criteria. Most of these basic hitch control functions are known and have been available on commercially available tractors with non-spring centered command levers.

However, in the present invention, wherein the hitch control system 10 has a command lever unit 34 which includes a spring-centered lever 33 instead of the conventional non-spring centered lever shown in U.S. Pat. No. 4,979,092, the algorithm executed by the control unit 24 is modified so that the hitch control system 10 operates as described below.

Figure 3:
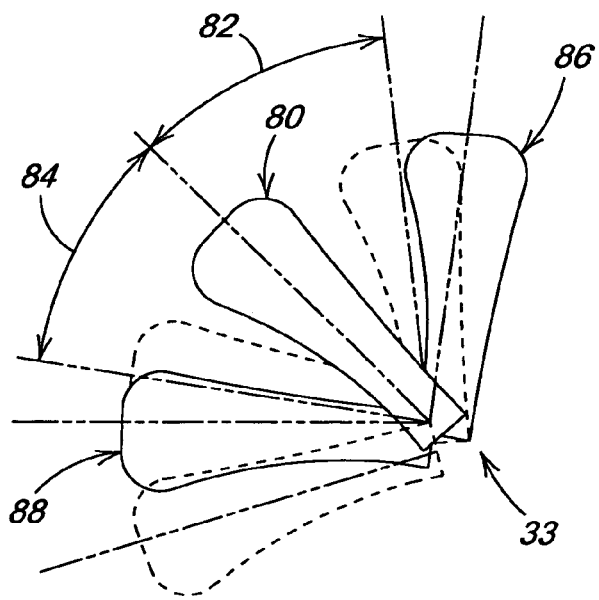
FIG. 3 is an illustration of the operative positions of the command lever of FIG. 1.

As best seen in FIG. 3, the hitch control unit 24 and the command lever 34 cooperate to define a centered position 80, Up and Down modulation or step ranges 82, 84, a detent up or back position 86, and a detent down or forward position 88.

The control unit 24 generates a hitch command signal as a function of the lever position signal. The control unit 24 generates a setpoint signal as a function of the command, load/depth mix, hitch position, draft force and wheel speed signals and as a function of various criteria. The control unit 24 stores the command signal as a setpoint signal in response to actuation of the set switch or button 50.

When a desired operating condition is achieved, actuating the set switch 50 causes the control unit 24 to store the current setpoint signal in a memory of the control unit 24 so that the stored setpoint can again be restored and re-used.

When the tractor wheel speed is less than 0.5 km/h, the draft/position mix value is ignored so that changes in hitch command cause predictable changes in the position of hitch 12. When the wheel speed exceeds 0.5 km/h, the valve command signals will be a function of the draft/position mix value.

Up and down modulation ranges: Referring to FIG. 3, if the lever 33 is moved away from the centered position 80 to within modulation ranges 82 or 84, and returned to center in less than a short time period (such as 0.5 second), the control unit 24 modifies (increases or decreases) the hitch command signal by one predetermined increment or step and correspondingly adjusts display features 62 and 64, independent of the exact duration or distance the lever 33 was moved within the modulation range.

If the wheel speed is less than a low speed threshold, such as 0.5 km/h, then the control unit 24 controls the valve command signals so that the rate of movement of the hitch 12 corresponds to the position of the lever 33 and this movement rate may be displayed by display 42.

If the wheel speed is greater than the low speed threshold, and the lever 33 is held in the outer portion (such as one third) of the modulation ranges 82 or 84 for more than 0.5 second, the control unit 24 generates valve command signals which cause the hitch 12 to move at a selected rate until the lever 33 is released, or until the operating point represented by the setpoint signal is reached, or until the hitch 12 engages a mechanical lower stop (not shown), if moving downward, or until a raise limit is reached, if moving upward, whichever occurs first.

If hitch movement is stopped because the hitch 12 reaches the operating point represented by the setpoint signal, and the lever 33 is moved to the nearest one of detent positions 86 or 88, then the control unit 24 will move the hitch 12 farther without the lever 33 being recentered. If the lever 33 is in the inner two thirds of modulation range 82 or 84 for more than a short time period (such as 0.5 second), then the hitch control unit 24 will move the hitch 12 at one third the selected rate until one of the above events occurs.

Detent up position: When the lever 33 is briefly moved to or held in the detent up position 86, the hitch control unit 24 causes the hitch 12 to move up at a set raise rate until the raise limit is reached (the hitch will not stop at an operating point). Once the raise limit is reached, the lever 33 must be re-centered before the hitch 12 can be raised farther. To move the hitch 12 upwardly above the raise limit, the lever 33 must be held in the detent up position 86, and the raise rate is preferably the same as that commanded by the external up/down switch. This procedure will allow the hitch to be moved above the raise limit.

If the lever 33 returns to center position 80 within 0.5 second of leaving the detent up position 86 and the hitch 12 is below the raise limit, control unit 24 will move hitch 12 at the set rate to the raise limit. If the hitch 12 is above the raise limit, the hitch 12 will stop moving as soon as the lever 33 leaves the detent up position 86.

Detent down position: When the lever 33 is held in the detent down position 88, the control unit 24 will move the hitch 12 down at the set drop rate until the operating point is reached or the hitch 12 reaches bottom, whichever occurs first. If the lever 33 returns to center position 80 within 0.5 second of leaving the detent down position 88, the control unit 24 lowers the hitch 12 at the set rate to the operating point. If the wheel speed is greater than 1 km/h, this command will raise the hitch 12 to the operating point, if it was below.

Command timeout: If the hitch 12 does not move up in response to an up command from lever 33, the up command is canceled and the hitch command is adjusted to reflect the present hitch position (as represented by the hitch position signal from sensor 28) five seconds after the lever 33 is returned to the center position 80 if wheel speed is continuously below 0.5 km/h. If the hitch 12 does not lower in response to a down command, the downward motion is limited to 100 mm (hitch command is set to present hitch position minus 100 mm) following 20 seconds of wheel speed continuously below 0.5 km/h and essentially no hitch movement.

The result is a hitch control system which allows the operator to quickly and repeatedly establish an operating condition (the setpoint), to modify the operating condition by controlled and repeatable amounts, and to conveniently raise the hitch and implement to a known position to allow field turns. This hitch control system allows an operator to modulate the rate of hitch movement and to easily move the hitch to the bottom position. This hitch control system also provides feedback to the operator on what the system is doing, and makes it possible to achieve repeatable results for small command lever movements. The system has a small number of controls and few interactions between controls. The position of the hitch command lever does not indicate or even suggest the position of the hitch, and there should be no operator confusion as to whether it does or not.

With the spring centered hitch command lever, the operator can conveniently modulate the hitch command, up or down, according to instantaneous circumstances. This makes minute adjustment of hitch position very easy, as when attaching an implement. The command lever includes a float position, which is also useful for hitch operation. It allows the operator to command the hitch to go to its lowest mechanically allowed position, without altering any setpoints. Such a control is useful for an implement which uses gauge wheels, or other times when the operator demands that the tractor provide no vertical support of the implement.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hitch control system for a vehicle having a hitch for integrally attaching an implement thereto and an actuator for raising and lowering the hitch in response to a valve command signal, the hitch control system having a sensor for generating a parameter signal representing a parameter of the hitch, an operator-movable command lever, a transducer for generating a lever position signal representing a position of the command lever, and a control unit generating a hitch command signal as a function of the lever position signal, the control unit having a closed-loop control mode wherein the valve command signal is generated in response to the parameter and hitch command signals, the improvement wherein:

the command lever comprises a spring-centered lever which is manually moveable from a centered position to deflected positions, and which automatically returns to the centered position when released from a deflected position.

2. The hitch control system of claim 1, wherein:

the control unit modifies the valve command signal by a predetermined magnitude in response to momentary deflection of the command lever to one of the deflected positions, said magnitude being independent of an amount and duration of deflection of the command lever if the duration is not more than a predetermined duration.

3. The hitch control system of claim 1, wherein:
the command lever has a proportional range of positions; and
when the command lever is moved out of its centered position and held for at least a certain time period in a displaced position within said proportional range, the control unit modifying the valve command signal and moving the hitch at a rate proportional to a magnitude of the displacement of the command lever from the centered position.

4. The hitch control system of claim 1, wherein:
the command lever has a raise detent position displaced from its centered position; and
when the command lever is moved into the raise detent position, the control unit modifying the valve command signal to cause the hitch to raise to an upper limit position.

5. The hitch control system of claim 1, wherein:
the command lever has a lower detent position displaced from its centered position; and
when the command lever is moved into the lower detent position, the control unit modifying the valve command signal to cause the hitch to lower to a lower limit position.

6. The hitch control system of claim 1, wherein:
the actuator comprises a hydraulic hitch cylinder, a raise valve for communicating the hitch cylinder with a pressure source and a lower valve for communication the hitch cylinder with a reservoir;
the command lever having a float position displaced from its centered position; and
when the command lever is moved into the float position, the control unit generating a valve command signal which causes the lower valve to open so that the hitch will move to a lowest mechanically allowed position.

7. The hitch control system of claim 1, wherein:
when the command lever is returned from a displaced position to the centered position, the control unit recalculates the command signal to match a sensed hitch position so that the hitch stops moving.

8. A hitch control system for a vehicle having a hitch for integrally attaching a ground engaging implement thereto and an actuator for raising and lowering the hitch in response to a valve command signal, the hitch control system having a sensor for generating a parameter signal representing a parameter of the hitch, an operator-movable command lever for generating operator hitch command signals, and a control unit for generating the valve command signals in response to the parameter and hitch command signals, the improvement wherein:
the command lever is moveable from a centered position to deflected positions; and
the control unit modifies the valve command signal by a predetermined magnitude in response to momentary deflection of the command lever to one of the deflected positions, said magnitude being independent of an amount and duration of deflection of the command lever if the duration is not more than a predetermined duration.

9. A hitch control system for a vehicle having a hitch for attaching an implement thereto and an actuator for raising and lowering the hitch in response to a valve command signal, the hitch control system comprising:
a sensor for generating a parameter signal representing a parameter associated with operation of the hitch;
a spring-centered command lever which is manually moveable from a centered position to deflected positions, and which automatically returns to the centered position when released from a deflected position;
a transducer operatively coupled to the command lever and generating a lever position signal; and
a control unit generating a hitch command signal as a function of the lever position signal, the control unit having a closed-loop control mode wherein the valve command signal is generated in response to the parameter and hitch command signals.

10. The hitch control system of claim 9, further comprising:
a display unit coupled to the control unit, the display unit displaying an upward pointing arrow when the hitch raise valve is operating, and displaying a downward pointing arrow when the hitch lower valve is being operated.

11. The hitch control system of claim 9, further comprising:
a display unit coupled to the control unit, the display unit displaying an upward pointing arrow when the hitch is moving upwardly, and displaying a downward pointing arrow when the hitch is moving downwardly.

* * * * *